United States Patent
Ishii et al.

(10) Patent No.: US 9,452,699 B2
(45) Date of Patent: Sep. 27, 2016

(54) VEHICLE SEAT AIR-CONDITIONING DEVICE

(71) Applicant: DENSO CORPORATION, Kariya, Aichi-pref. (JP)

(72) Inventors: Fumiya Ishii, Obu (JP); Masafumi Kawashima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/428,576

(22) PCT Filed: Sep. 5, 2013

(86) PCT No.: PCT/JP2013/005275
§ 371 (c)(1),
(2) Date: Mar. 16, 2015

(87) PCT Pub. No.: WO2014/045538
PCT Pub. Date: Mar. 27, 2014

(65) Prior Publication Data
US 2015/0251578 A1    Sep. 10, 2015

(30) Foreign Application Priority Data
Sep. 18, 2012    (JP) ................. 2012-204517

(51) Int. Cl.
*A47C 7/74*    (2006.01)
*B60N 2/56*    (2006.01)
*B60H 1/00*    (2006.01)

(52) U.S. Cl.
CPC ............. *B60N 2/56* (2013.01); *B60H 1/00285* (2013.01); *B60N 2/565* (2013.01)

(58) Field of Classification Search
CPC ..... B60N 2/565; B60N 2/56; B60H 1/00285
USPC ............... 297/180.1, 180.12, 180.13, 180.14
See application file for complete search history.

(56) References Cited

U.S. PATENT DOCUMENTS 5,450,894 A * 9/1995 Inoue ................. B60H 1/00285
                                                                  297/180.1 X
5,524,439 A    6/1996 Gallup et al.
(Continued)

FOREIGN PATENT DOCUMENTS

CN    202432613 U    9/2012
JP    2004100585 A    4/2004
(Continued)

OTHER PUBLICATIONS

Office Action dated Dec. 1, 2015 issued in the corresponding JP application No. 2012-204517 in Japanese with English translation.
(Continued)

*Primary Examiner* — Rodney B White
(74) *Attorney, Agent, or Firm* — Harness, Dickey & Pierce, P.L.C.

(57) ABSTRACT

A vehicle seat air-conditioning device includes a vehicle seat, an electric blower, and a plurality of ducts. The vehicle seat includes a plurality of regions. The electric blower includes a plurality of fans and one electric motor. The plurality of fans correspond to the plurality of regions, respectively. The electric blower drives the plurality of fans by the one electric motor to have blowing capacity corresponding to the plurality of regions respectively. Each of the plurality of ducts is provided between a corresponding one of the plurality of regions and a corresponding one of the plurality of fans. An air flow produced by each of the plurality of fans passes through a corresponding one of the plurality of ducts. The air flow passing through each of the plurality of ducts air-conditions or ventilates a corresponding one of the plurality of regions.

12 Claims, 6 Drawing Sheets

(56) References Cited

U.S. PATENT DOCUMENTS

| | | | | |
|---|---|---|---|---|
| 5,902,014 A * | 5/1999 | Dinkel | B60N 2/5635 | |
| | | | 297/180.14 X | |
| 6,206,465 B1 * | 3/2001 | Faust | A47C 7/74 | |
| | | | 297/180.14 X | |
| 6,644,735 B2 * | 11/2003 | Bargheer | B60H 1/00285 | |
| | | | 297/180.13 | |
| 6,848,742 B1 | 2/2005 | Aoki et al. | | |
| 6,976,734 B2 * | 12/2005 | Stoewe | B60N 2/5657 | |
| | | | 297/180.14 X | |
| 7,261,372 B2 * | 8/2007 | Aoki | B60N 2/5635 | |
| | | | 297/180.14 X | |
| 7,621,594 B2 * | 11/2009 | Hartmann | B60H 1/00821 | |
| | | | 297/180.12 X | |
| 8,360,517 B2 * | 1/2013 | Lazanja | B60N 2/5635 | |
| | | | 297/180.14 X | |
| 2002/0011071 A1 * | 1/2002 | Needham | B60H 1/00285 | |
| | | | 297/180.13 X | |
| 2004/0164594 A1 * | 8/2004 | Stoewe | B60N 2/5657 | |
| | | | 297/180.14 | |
| 2006/0130490 A1 | 6/2006 | Petrovski | | |
| 2006/0290175 A1 * | 12/2006 | Hartwich | B60H 1/00285 | |
| | | | 297/180.14 X | |
| 2008/0036249 A1 * | 2/2008 | Heckmann | B60H 1/00407 | |
| | | | 297/180.13 | |
| 2008/0136221 A1 * | 6/2008 | Hartmann | B60H 1/00821 | |
| | | | 297/180.14 | |
| 2010/0001558 A1 | 1/2010 | Petrovski | | |
| 2010/0253117 A1 * | 10/2010 | Bajic | A47C 7/72 | |
| | | | 297/180.12 | |
| 2011/0031786 A1 * | 2/2011 | Kurokawa | F04D 17/16 | |
| | | | 297/180.14 | |
| 2011/0253340 A1 | 10/2011 | Petrovski | | |

FOREIGN PATENT DOCUMENTS

| | | |
|---|---|---|
| JP | 2005030613 A | 2/2005 |
| JP | 3804566 B2 | 8/2006 |
| JP | 2008523924 A | 7/2008 |
| JP | 2008296840 A | 12/2008 |
| JP | 2009120079 A | 6/2009 |
| JP | 2009243405 A | 10/2009 |
| WO | WO-2006117690 A2 | 11/2006 |

OTHER PUBLICATIONS

International Search Report and Written Opinion (in Japanese with English Translation) for PCT/JP2013/005275, mailed Dec. 10, 2013; ISA/JP.

* cited by examiner

THE OTHER SIDE ←—— AXIS DIRECTION ——→ ONE SIDE

THE OTHER SIDE ← AXIS DIRECTION → ONE SIDE

THE OTHER SIDE ← AXIS DIRECTION → ONE SIDE

FIG. 11 RELATED ART

VEHICLE SEAT AIR-CONDITIONING DEVICE

CROSS REFERENCE TO RELATED APPLICATIONS

This application is a U.S. National Phase Application under 35 U.S.C. 371 of International Application No. PCT/JP2013/005275 filed on Sep. 5, 2013 and published in Japanese as WO 2014/045538 A1 on Mar. 27, 2014. This application is based on and claims the benefit of priority from Japanese Patent Application No. 2012-204517 filed on Sep. 18, 2012. The entire disclosures of all of the above applications are incorporated herein by reference.

TECHNICAL FIELD

The present disclosure relates to a vehicle seat air-conditioning device.

BACKGROUND ART

There is known an art whereby air is blown by a blower from a seat surface to an occupant to improve comfortableness of a part of a seat with which the occupant is in contact in a vehicle seat air-conditioning device.

As described in Patent Documents 1, 2, an electric fan that drives one fan by one electric motor may be used as an air-blowing method in such an air-conditioning device. Specifically, there are a method whereby two air outlets are provided for blowing air respectively to a seating surface side and a backrest side by one electric fan, as described in Patent Document 1, and a method whereby a branched part duct is provided for guiding the blown air blown out of one electric fan respectively to a seating surface side and a backrest side, as described in Patent Document 2. In addition, there is a double-fan method whereby air is blown to a seating surface side by the first electric fan, and air is blown to a backrest side by the second electric fan, as described in Patent Document 3.

PRIOR ART DOCUMENTS

Patent Documents

Patent Document 1: JP2004-100585A
Patent Document 2: JP2005-30613A
Patent Document 3: Japanese Patent No. 3804566

The present inventors have examined improvement of blowing capacity of the electric fan to enhance air conditioning capacity of the vehicle seat air-conditioning device.

To use an electric motor having great capacity to drive a fan in an electric fan, or to configure an electric fan with large blowing capacity using more than one electric motor, causes cost increases. To achieve a low-cost vehicle seat air-blowing device, if both the seating surface side and the backrest side are air-conditioned or ventilated by one electric fan by use of the air-blowing method by the above Patent Document 1, the blowing pressure of a blower is not sufficient.

Such an issue also arise when other regions than the seating surface and the backrest are air-conditioned or ventilated.

Figure 11:
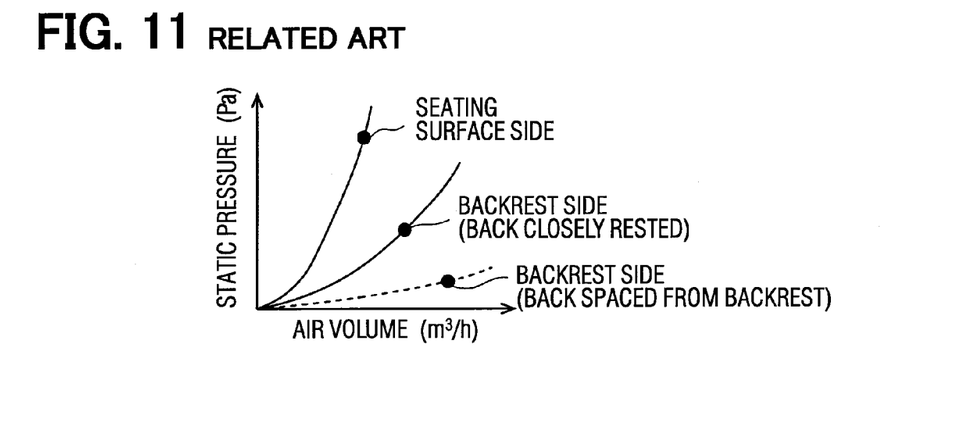
FIG. 11 is a diagram illustrating a relationship between air volume ($m^3/h$) and static pressure (Pa) in accordance with a comparative example.

By the duct branching method in the above Patent Document 2, if an occupant makes a seating posture change to space his/her back from the seating surface, a balance is changed between pressure loss on the seating surface side and pressure loss on the backrest side. Accordingly, the air volume on the backrest side changes (see FIG. 11). Thus, a balance between the air volume on the seating surface side and the air volume on the backrest side is unintendedly changed.

SUMMARY OF INVENTION

The present disclosure addresses the above issues. Thus, in a vehicle seat air-conditioning device, it is a first objective of the present disclosure to achieve a low cost and to increase blowing capacity, and it is a second objective of the present disclosure to limit a change of an air volume balance between air volume on a seating surface side and air volume on a backrest side even though an occupant changes his/her seating posture.

To achieve the objectives of the present disclosure, the vehicle seat air-conditioning device in the first aspect of the present disclosure includes a vehicle seat, an electric blower, and a plurality of ducts. The vehicle seat includes a plurality of regions. The electric blower includes a plurality of fans and one electric motor. The plurality of fans correspond to the plurality of regions, respectively. The electric blower drives the plurality of fans by the one electric motor to have blowing capacity corresponding to the plurality of regions respectively. Each of the plurality of ducts is provided between a corresponding one of the plurality of regions and a corresponding one of the plurality of fans. An air flow produced by each of the plurality of fans passes through a corresponding one of the plurality of ducts. The air flow passing through each of the plurality of ducts air-conditions or ventilates a corresponding one of the plurality of regions.

Accordingly, the electric blower produces blowing capacity corresponding to the region for each fan. Thus, the blowing capacity as the electric blower can be increased. In addition, because more than one type of fans are driven by one electric motor, a low cost can be achieved. Therefore, the blowing capacity can be increased with the low cost accomplished.

The plurality of regions in the second aspect of the present disclosure include a seating surface and a backrest. The plurality of fans include two fans corresponding to the seating surface and the backrest, respectively. The electric blower drives the two fans by the one electric motor.

Accordingly, the electric blower drives two types of fans corresponding to the seating surface and the backrest, respectively, by one electric motor. The pressure loss on the seating surface side is higher than the pressure loss of the backrest. The rotating speed of the electric motor depends on the seating surface side having the higher pressure loss. Thus, even if an occupant spaces his/her back from the backrest, the air volume on the seating surface side is not impaired. As a result, a change of an air volume balance between the seating surface and the backrest can be restricted despite the change of pressure loss due to the posture change of the occupant.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments will be described below in reference to the accompanying drawings. For the same or equivalent component in the following embodiments, the same corresponding reference numeral is used in the drawings to simplify the description of the component.

First Embodiment

Figure 1:
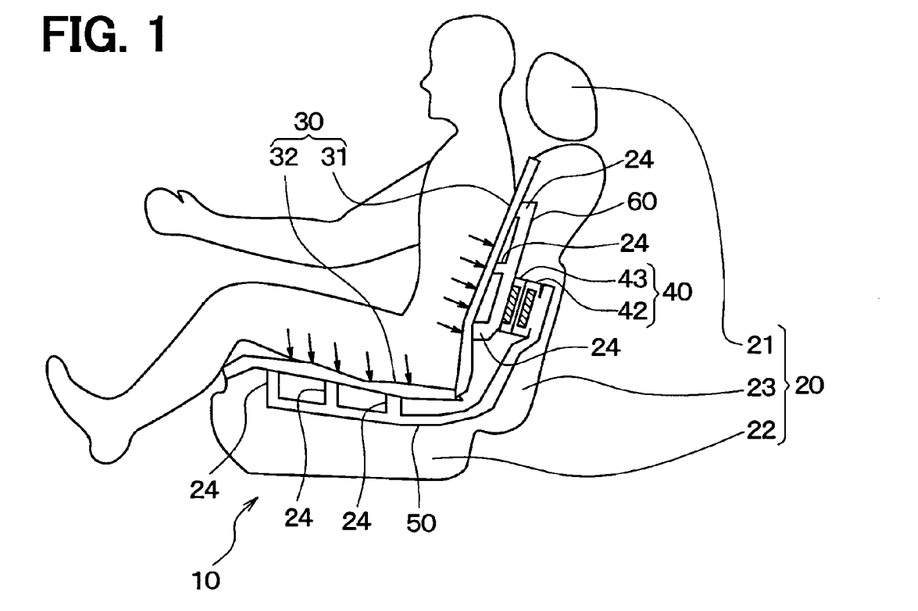
FIG. 1 is a diagram illustrating a configuration of a vehicle seat air-conditioning device in accordance with a first embodiment.

FIG. 1 illustrates an entire configuration of a vehicle seat air-conditioning device 10 of a first embodiment.

As illustrated in FIG. 1, the vehicle seat air-conditioning device 10 includes a vehicle seat 20, a seat surface 30, an electric blower 40, and blow ducts 50, 60. The vehicle seat 20 includes a headrest 21, a seat cushion 22, and a seatback 23.

The headrest 21 supports a head of an occupant of the vehicle. The seat cushion 22 supports thighs and buttocks of the occupant. The seatback 23 supports a back of the occupant.

Figure 2:
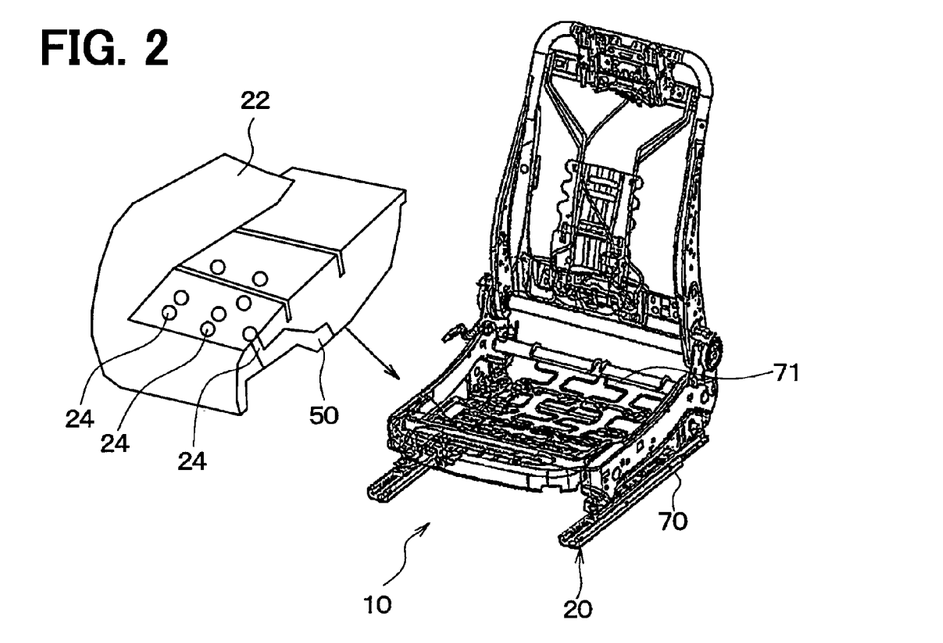
FIG. 2 is an exploded view illustrating a vehicle seat in FIG. 1.

As illustrated in FIG. 2, the vehicle seat 20 includes a seat frame 70. The seat frame 70 includes seat wires 71 serving as resilient members. The seat frame 70 supports the headrest 21, the seat cushion 22, and the seatback 23 together with the seat wires 71.

The seat cushion 22 and the seatback 23 of the present embodiment are configured from urethane resin or the like. As illustrated in FIGS. 1 and 2, the seat cushion 22 and the seatback 23 include ventilation passages 24 that respectively open toward the occupant.

The seat surface 30 in FIG. 1 is made of a sheet (e.g., non-woven fabric) having breathability. The seat surface 30 is formed to cover each of the seat cushion 22 and the seatback 23. A region of the seat surface 30 that covers the seat cushion 22 serves as a seating surface 32. A region of the seat surface 30 that covers the seatback 23 serves as a backrest 31.

The backrest 31 and the seating surface 32 of the present embodiment respectively constitute the regions recited in CLAIMS. The electric blower 40 in FIG. 1 is provided in the seatback 23.

Figure 3:
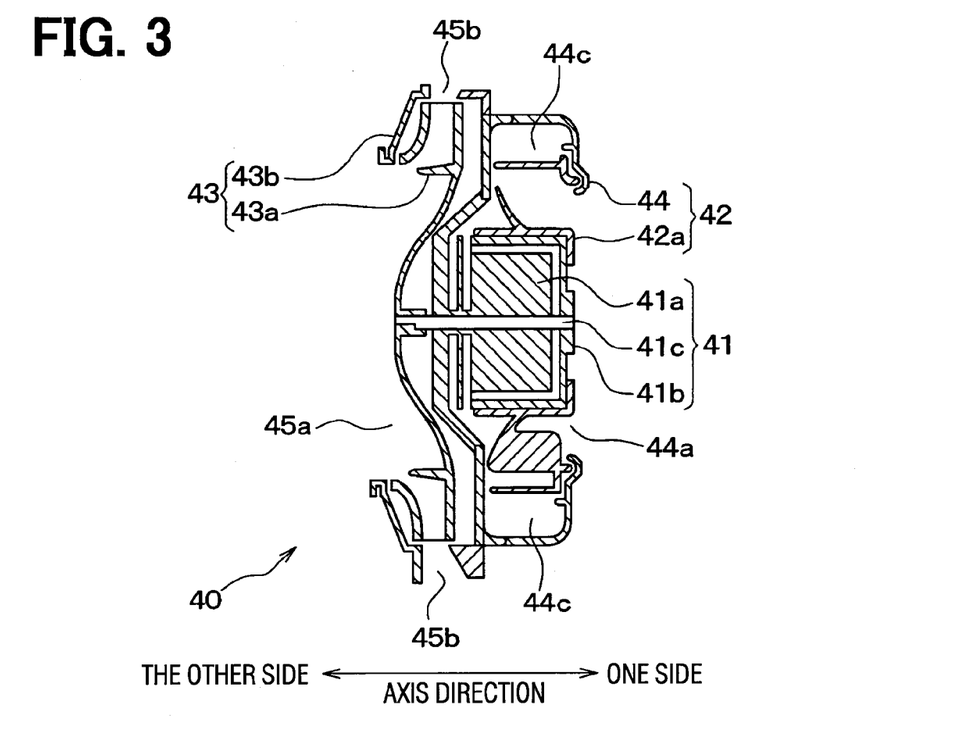
FIG. 3 is a sectional view illustrating an electric blower in FIG. 1.
Figure 4:
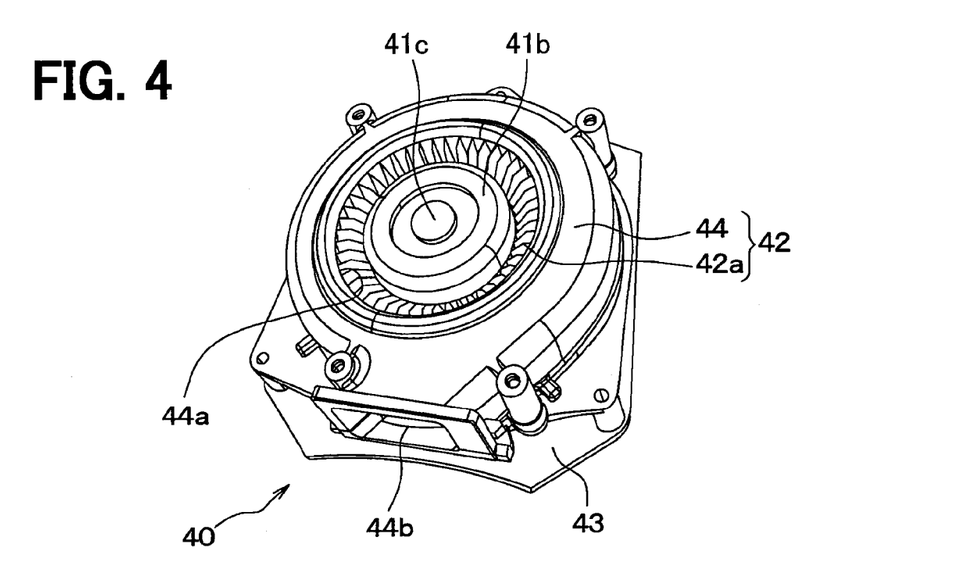
FIG. 4 is a perspective view illustrating the electric blower in FIG. 1.
Figure 5:
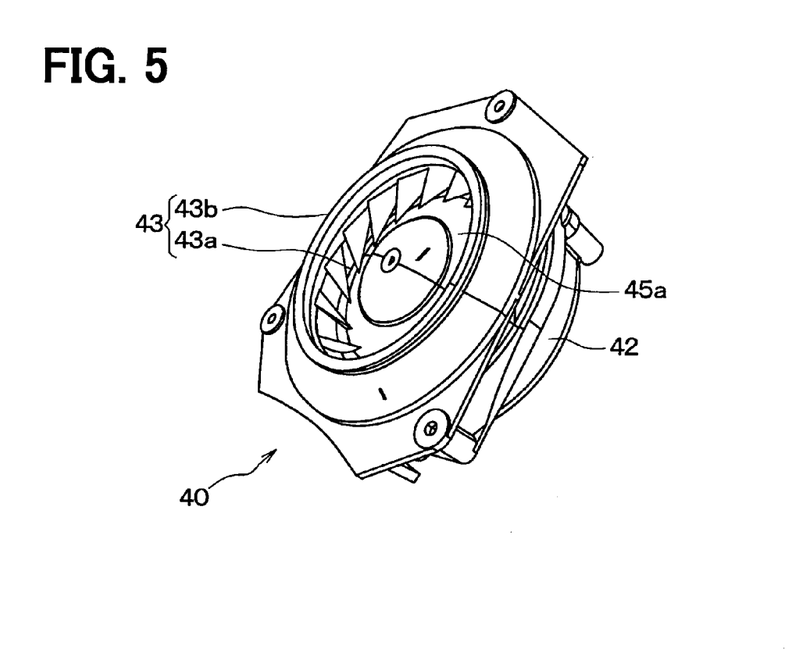
FIG. 5 is a perspective view illustrating the electric blower in FIG. 1.

The structure of the electric blower 40 of the present embodiment will be described with reference to FIGS. 3 to 5. FIG. 3 is a sectional view of the electric blower 40, and FIG. 4 is a perspective view illustrating one side of the electric blower 40 in the axis direction. FIG. 5 is a perspective view illustrating the other side of the electric blower 40 in the axis direction.

As illustrated in FIG. 3, the electric blower 40 includes an electric motor 41 and blowers 42, 43. The electric motor 41 is an outer-rotor type motor in which a short cylindrical rotor 41b is disposed radially outward of a stator 41a.

The stator 41a is disposed radially outward of a rotation shaft 41c. One side of the rotation shaft 41c in the axis direction is connected to the rotor 41b. Accordingly, the rotor 41b and the rotation shaft 41c rotate around the axis of the rotation shaft 41c.

The blower 42 is disposed on one side of the electric motor 41 in the axis direction. The blower 42 includes a sirocco fan 42a and a scroll case 44.

The sirocco fan 42a is a centrifugal multiblade fan including blades that are supported by the rotor 41b and are arranged in the rotation direction around the axis of the rotor 41b. The sirocco fan 42a draws in air from one side in the axis direction and blows the air radially outward by its rotation.

The scroll case 44 is a case that accommodates the sirocco fan 42a and that includes a suction port 44a. The suction port 44a opens on one side of the sirocco fan 42a in the axis direction. As illustrated in FIG. 4, the scroll case 44 includes an air outlet 44b. The air outlet 44b opens radially outward of the sirocco fan 42a.

The scroll case 44 includes an air passage 44c (see FIG. 3) radially outward of the sirocco fan 42a. The air passage 44c is a ventilation passage that collects air blown out of the sirocco fan 42a to guide the air to the air outlet 44b (see FIG. 4). The cross-sectional area of the air passage 44c becomes larger toward the air outlet 44b in the rotation direction of the rotation shaft 41c. The cross-sectional area of the air passage 44c is a cross-sectional area in a direction perpendicular to a flow direction of the air flowing toward the air outlet 44b.

The blower 43 is disposed on the other side of the electric motor 41 in the axis direction. The blower 43 includes a turbo fan 43a and a case 43b.

The turbo fan 43a is supported by the other side of the rotation shaft 41c in the axis direction. The turbo fan 43a is a centrifugal fan that draws in air from the other side in the axis direction and that blows the air radially outward by its rotation. The case 43b accommodates the turbo fan 43a and includes a suction port 45a, and an air outlet 45b (see FIG. 3). The suction port 45a opens on the other side of the turbo fan 43a in the axis direction. The air outlet 45b opens radially outward of the turbo fan 43a.

The blow duct 50 in FIG. 1 communicates between the ventilation passages 24 of the seat cushion 22 and the suction port 44a of the scroll case 44 of the blower 42. The blow duct 60 communicates between the ventilation passages 24 of the seatback 23 and the suction port 45a of the case 43b of the blower 43. Accordingly, the blower 42 corresponds to the seating surface 32, and the blower 43 corresponds to the backrest 31.

Characteristics of a blow passage and the electric blower 40 of the present embodiment will be described in reference to FIG. 6(*a*) and FIG. 6(*b*).

Figure 6:
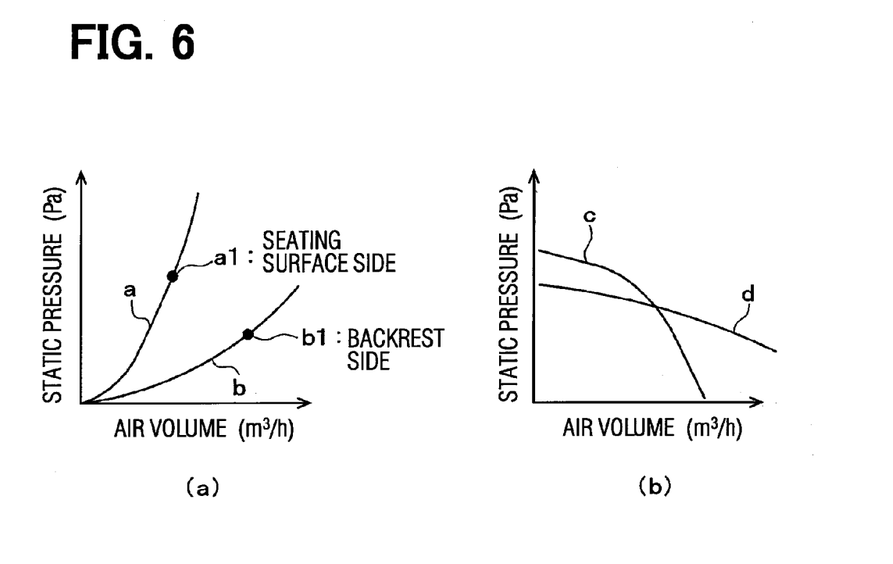
FIG. 6(a) is a diagram illustrating draft resistance of a blow passage in FIG. 1.
FIG. 6(b) is a diagram illustrating a relationship between air volume ($m^3/h$) and static pressure (Pa) of the electric blower in FIG. 1.

FIG. 6(*a*) is a graph illustrating draft resistance of the blow passage with its vertical axis indicating static pressure (Pa) in the blow passage and horizontal axis indicating air volume (m$^3$/h) in the blow passage. "a" is a graph indicating the draft resistance of the blow passage on the seating surface 32-side, and "b" is a graph indicating the draft resistance of the blow passage on the backrest 31-side. The blow passage on the seating surface 32-side is a passage that is constituted of the blow duct 50 and the ventilation passages 24 of the seat cushion 22. The blow passage on the backrest 31-side is a passage that is constituted of the blow duct 60 and the ventilation passages 24 of the seatback 23.

In the present embodiment, as is noted from the graphs "a" and "b" in FIG. 6(*a*), the static pressure in the blow passage on the seating surface 32-side is higher than the static pressure in the blow passage on the backrest 31-side.

FIG. 6(*b*) is a graph illustrating characteristics of air volume (m$^3$/h) of the blowers 42, 43-static pressure (Pa) with its vertical axis indicating the static pressure (Pa) and horizontal axis indicating the air volume (m$^3$/h). "c" is a graph indicating characteristics of air volume (m$^3$/h) of the blower (sirocco fan) 42-static pressure (Pa). "d" is a graph indicating characteristics of air volume (m$^3$/h) of the blower (turbo fan) 43-static pressure (Pa).

In the present embodiment, the blower 42 has high static pressure in a region where air volume is low, but the static pressure becomes rapidly lower as the air volume of the blower 42 becomes higher, and the static pressure becomes zero in a region of the highest air volume of the blower 42. As the air volume of the blower 43 becomes higher, the static pressure gradually becomes lower but a slope of reduction in static pressure is smaller than the blower 42.

Operation of the present embodiment will be described below.

When the electric motor 41 of the electric blower 40 rotates, the sirocco fan 42*a* is rotated in accordance with the rotation of the rotor 41*b*. The seating surface 32 of the seat surface 30 is ventilated by this rotation of the sirocco fan 42*a*.

Specifically, air flows from the thighs and buttocks-side of the occupant into the ventilation passages 24 of the seat cushion 22 through the seating surface 32 of the seat surface 30. This flowing air flows respectively from the ventilation passages 24 into the suction port 44*a* of the scroll case 44 through the blow duct 50. This air flowing into the suction port 44*a* flows into the air passage 44*c* through the sirocco fan 42*a*.

Thus, by the rotation of the sirocco fan 42*a*, the air is drawn into the sirocco fan 42*a* through the seating surface 32 of the seat surface 30, the ventilation passages 24 of the seat cushion 22, the blow duct 50, and the suction port 44*a*. This drawn air is collected into the air passage 44*c*, and this air collected in the air passage 44*c* is blown out of the air outlet 44*b*.

In addition, when the electric motor 41 rotates, the turbo fan 43*a* is rotated in accordance with the rotation of the rotation shaft 41*c*. The backrest 31 of the seat surface 30 is ventilated by this rotation of the turbo fan 43*a*.

Specifically, in accordance with the rotation of the turbo fan 43*a*, air flows from the back-side of the occupant into the ventilation passages 24 of the seatback 23 through the backrest 31 of the seat surface 30. This flowing air is drawn into the turbo fan 43*a* respectively from the ventilation passages 24 through the blow duct 60 and the suction port 45*a* of the case 43*b* of the blower 43. This air drawn into the turbo fan 43*a* is blown out of the air outlet 45*b* of the case 43*b*.

According to the present embodiment described above, as a result of the respective rotations of the sirocco fan 42*a* and the turbo fan 43*a*, the backrest 31 and the seating surface 32 are ventilated, respectively. At the time of ventilation of the backrest 31 and the seating surface 32, the seating surface 32 has larger pressure loss than the backrest 31. Additionally, to make the occupant seated on the vehicle seat 20 feel coolness, the air volume on the backrest 31-side needs to be larger than the air volume on the seating surface 32-side.

In the light of these, the blower 42 including the scroll case 44 and the sirocco fan 42*a* is configured for the seating surface 32 having larger pressure loss, and the blower 43 including the turbo fan 43*a* is configured for the backrest 31 which requires larger air volume.

Therefore, the blowers 42, 43 are configured using different types of fans corresponding to the seating surface 32 and the backrest 31. The sirocco fan 42*a* corresponding to the seating surface 32 is configured into such a fan shape as to have higher blowing pressure (static pressure) than the turbo fan 43*a* corresponding to the backrest 31. The turbo fan 43*a* corresponding to the backrest 31 is configured into such a fan shape as to have larger blowing air volume than the sirocco fan 42*a* corresponding to the seating surface 32. Accordingly, in FIG. 6(*a*), "a1" can be an operating point of the blower 42 corresponding to the seating surface 32, and "b1" can be an operating point of the blower 43 corresponding to the backrest 31. The operating point a1 has higher static pressure than the operating point b1, and the operating point b1 has larger air volume (m$^3$/h) than the operating point a1.

The operating point is a point indicating a relationship between air volume and static pressure in a blower on the two-dimensional coordinate with its vertical axis as the static pressure and horizontal axis as the air volume. In the present embodiment, when FIG. 6(*a*) and FIG. 6(*b*) overlap with each other, an intersection point of the graph "a" and the graph "c" is set at the operating point a1, and an intersection point of the graph "b" and the graph "d" is set at the operating point b1.

As described above, there can be configured the electric blower 40 for ventilating the seating surface 32-side and the backrest 31-side by driving the blowers 42, 43, which blow air at the operating points a1, b1 corresponding to the respective regions of the fans, by one electric motor 41. The regions are those regions (e.g., seating surface 32, backrest 31) of the vehicle seat 20 which are ventilated (or air-conditioned). Thus, in the electric blower 40, the sirocco fan 42*a* corresponding to the seating surface 32 and the turbo fan 43*a* corresponding to the backrest 31 are driven by one electric motor 41, and the sirocco fan 42*a* has blowing capacity corresponding to the seating surface 32, and the turbo fan 43*a* has blowing capacity corresponding to the backrest 31. Accordingly, in the electric blower 40, the blowing capacity can be increased with a low cost accomplished.

By the duct branching method in the above Patent Document 2, if the occupant makes a seating posture change to space his/her back from the seating surface, a balance is changed between the pressure loss of the seating surface and the pressure loss of the backrest. As a result, a balance between the air volume on the seating surface side and the air volume on the backrest side is unintendedly changed.

On the other hand, in the present embodiment, one electric motor 41 drives the blowers 42, 43, and the blow ducts 50, 60 corresponding to the seating surface 32 and the backrest 31 are provided. Accordingly, the rotating speed of the electric motor 41 depends on the seating surface 32-side having higher pressure loss. Thus, the air volume on the seating surface 32-side is not impaired even if the occupant spaces his/her back away from the backrest 31. As a result, a change of an air volume balance between the seating surface 32 and the backrest 31 can be restricted despite the change of pressure loss due to the posture change of the occupant.

Second Embodiment

In the above-described first embodiment, it is illustrated that the electric blower 40 is disposed on the backrest 31-side. Alternatively, in the present embodiment, an electric blower 40 is arranged on a seating surface 32-side.

Figure 7:
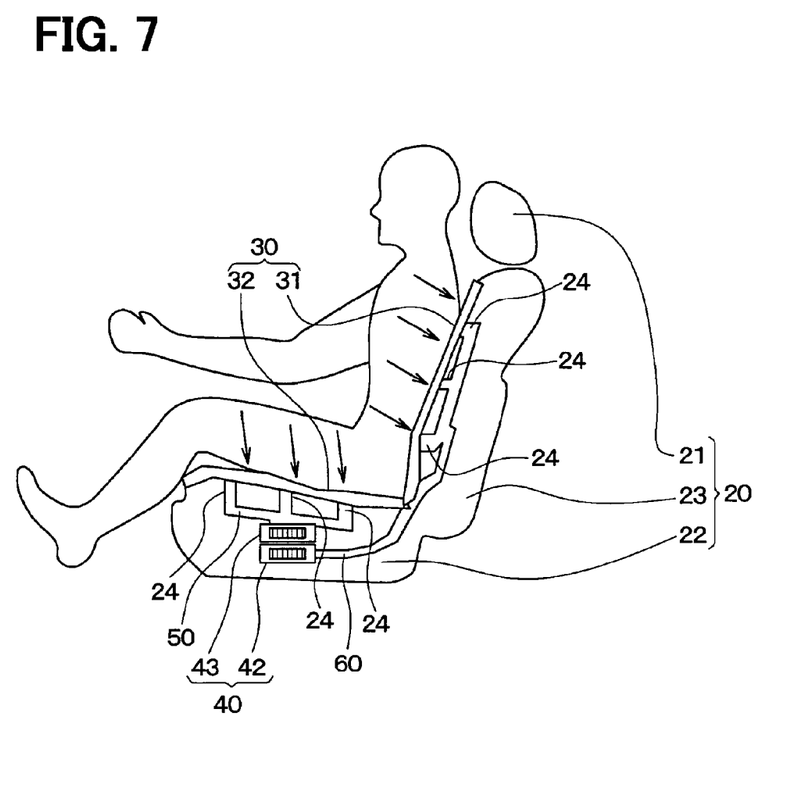
FIG. 7 is a diagram illustrating a configuration of a vehicle seat air-conditioning device in accordance with a second embodiment.

FIG. 7 is a diagram illustrating a configuration of a vehicle seat air-conditioning device 10 of the present embodiment.

The electric blower 40 of the present embodiment is disposed in a seat cushion 22. The electric blower 40 may be attached directly to a seat frame 70 which constitutes the seat cushion 22, or may be attached to a seat wire 71 via a bracket.

According to the above-described present embodiment, because the electric blower 40 is disposed on the seating surface 32-side, the electric blower 40 can be distanced from an ear position of an occupant seated on a vehicle seat 20. As a result, an uncomfortable feeling of the occupant due to a noise produced by the electric blower 40 can be restrained.

Third Embodiment

In the above-described second embodiment, since the electric blower 40 is disposed on the seating surface 32-side, the blow duct 60 communicating between the ventilation passages 24 of the seatback 23 and the blower 43 increases in length, and a bent position of the blow duct 60 increases in number. Accordingly, the pressure loss caused when the blower 43 ventilates the backrest 31 increases.

Figure 8:
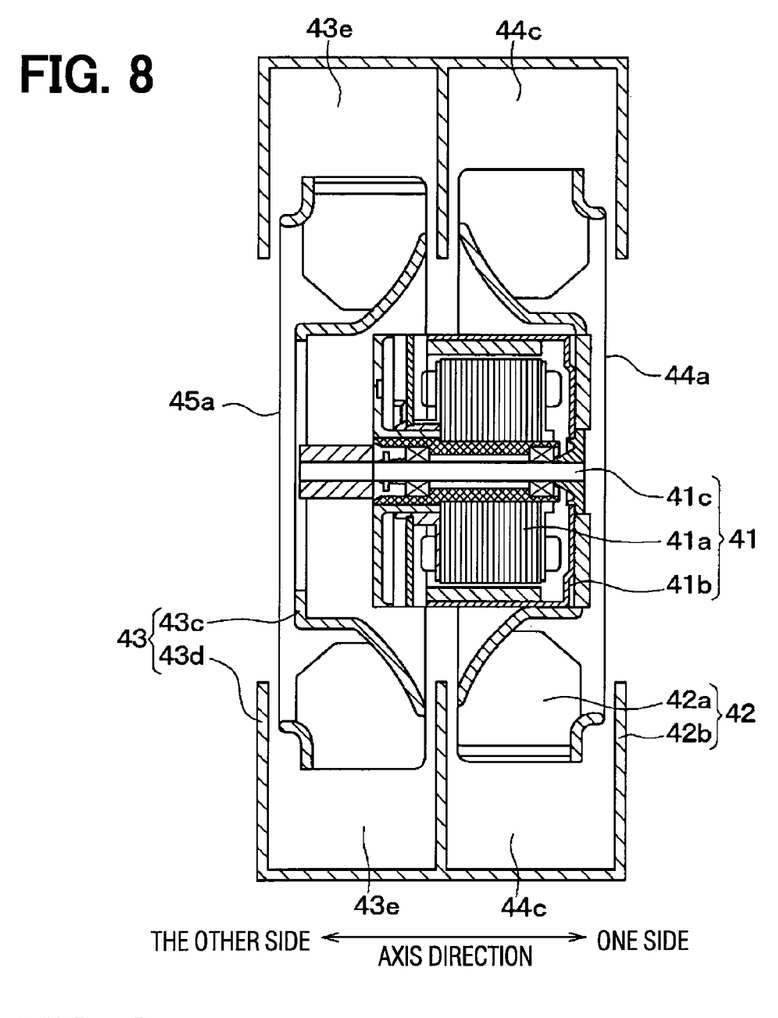
FIG. 8 is a sectional view illustrating an electric blower in accordance with a third embodiment.

In the present embodiment, the same blower 42 as in the above second embodiment is used for a blower 42 for ventilating a seating surface 32, whereas a blower 43 corresponding to a backrest 31 is constituted of a sirocco fan 43c and a scroll case 43d in FIG. 8 in place of the turbo fan 43a and the case 43b in FIG. 3.

Figure 9:
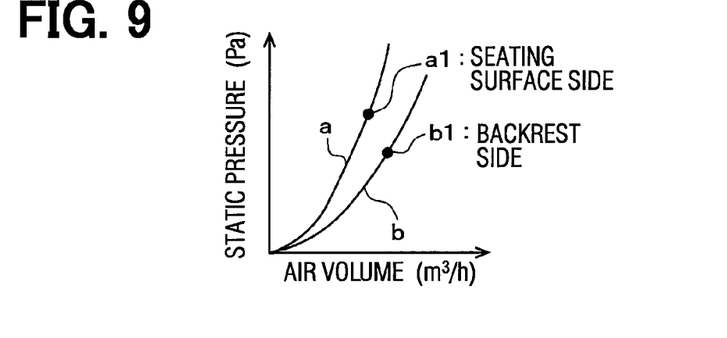
FIG. 9 is a diagram illustrating draft resistance of a blow passage in FIG. 8.

Similar to the scroll case 44, the scroll case 43d defines a flow passage 43e that accommodates the sirocco fan 43c and that collects the flow of air blown out of the sirocco fan 43c to flow this air toward an air outlet 45b. Accordingly, static pressure of the blower 43 of the present embodiment can be made higher than the static pressure of the blower 43 of the above-described second embodiment. In FIG. 9, "a" is a graph indicating draft resistance of a blow passage on the seating surface 32-side, and "b" is a graph indicating draft resistance of a blow passage on the backrest 31-side. "a1" is an operating point of the blower 42 corresponding to the seating surface 32, and "b1" is an operating point of the blower 43 corresponding to the backrest 31. The operating point b1 in FIG. 9 is set at an operating point of higher static pressure and smaller air volume than the operating point b1 in FIG. 6(a).

Although the blowers 42, 43 of the present embodiment are configured respectively by the same type of sirocco fan, a sirocco fan 42a constituting the blower 42 is configured into such a fan shape as to have higher static pressure than a sirocco fan 43c constituting the blower 43, and the sirocco fan 43c is configured into such a fan shape as to have larger air volume than the sirocco fan 42a.

Fourth Embodiment

In the above-described first embodiment, the other side of the rotation shaft 41c in the axis direction supports the turbo fan 43a. Accordingly, a distance (i.e., radius) between the axis of the rotation shaft 41c and a radially outer side of the turbo fan 43a is made large. As a result, the centrifugal force of the turbo fan 43a becomes large. For this reason, a decrease in stability of the rotation of the turbo fan 43a and noise generation may be caused.

Figure 10:
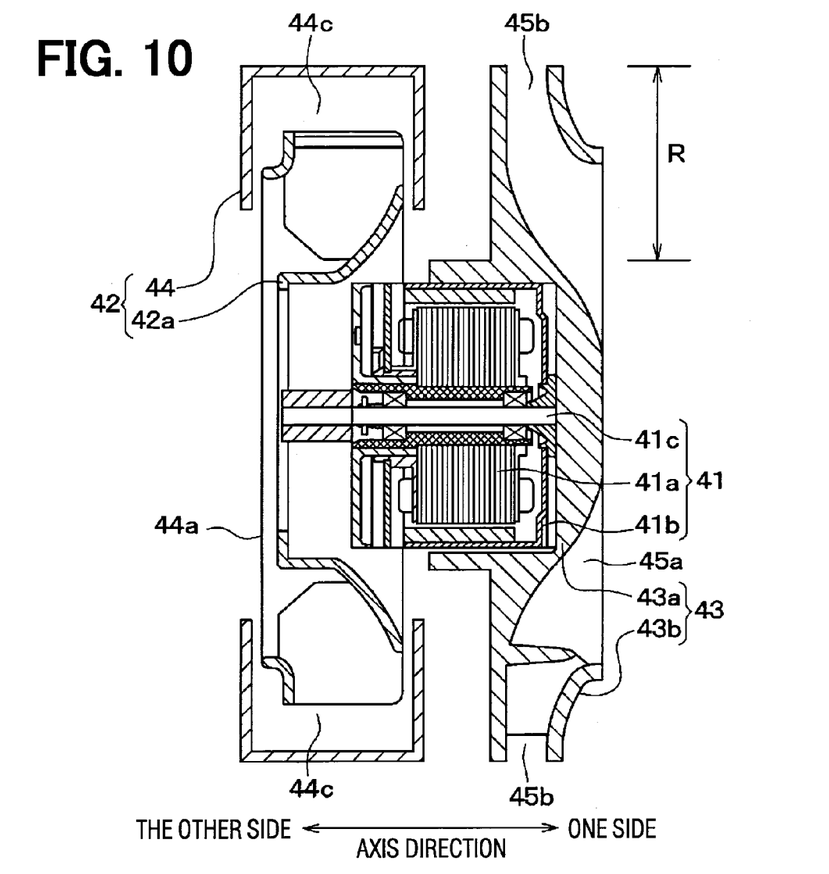
FIG. 10 is a sectional view illustrating an electric blower in accordance with a fourth embodiment.

In the present embodiment, the other side of a rotation shaft 41c in the axis direction supports a sirocco fan 42a, and a rotor 41b supports a turbo fan 43a. In this case, a distance R between a radially outer side of the rotor 41b and a radially outer side of the turbo fan 43a is a radius of the turbo fan 43a. Accordingly, the radius of the turbo fan 43a can be made smaller than in the above first to third embodiments. As a result, the centrifugal force of the turbo fan 43a becomes small. For this reason, improvement in stability of the rotation of the turbo fan 43a and reduced noise generation can be realized.

In addition, in the present embodiment, radial sizes of blowers 42, 43 are set to be the same as each other.

Modifications of the above embodiments will be described below. In the above-described first to fourth embodiments, it is illustrated that the air is suctioned respectively from the seating surface 32 and the backrest 31 toward the blowers 42, 43 by the electric blower 40 to ventilate the seating surface 32 and the backrest 31. Alternatively, the following (a), (b) may be employed.

(a) The air is sent in respectively to the seating surface 32 and the backrest 31 from the blowers 42, 43 by the electric blower 40 to ventilate the seating surface 32 and the backrest 31.

(b) The seating surface 32 and the backrest 31 may be air-conditioned using first and second heat exchangers. Specifically, heat of the air produced from the blower 42 is exchanged with the first heat exchanger, and by flowing this air whose heat is exchanged toward the seating surface 32, the seating surface 32 is air-conditioned. Heat of the air produced from the blower 43 is exchanged with the second heat exchanger, and by flowing this air whose heat is exchanged toward the backrest 31, the backrest 31 is air-conditioned. A heat exchanger for heating that heats air, or a heat exchanger for cooling that cools air can be used for the first and second heat exchangers.

In the above first to fourth embodiments, it is illustrated that the electric blower 40 is configured by the two fans of the sirocco fan 42a, 43c and the turbo fan 43a. Alternatively, the electric blower 40 may be configured by three or more fans.

In the above first to third embodiments, it is illustrated that the seating surface 32 and the backrest 31 are set at the regions to be ventilated. Alternatively, for example, other regions (e.g., headrest) than the seating surface 32 and the backrest 31 may be set at regions to be ventilated (or air-conditioned).

In the above third embodiment, it is illustrated that when the electric blower 40 is disposed on the seating surface 32-side, the blowers 42, 43 are configured respectively by the sirocco fans 42a, 43c. Instead of this, when the electric blower 40 is disposed on the backrest 31-side, the blowers 42, 43 may be configured respectively by the sirocco fans 42a, 43c.

In the above first to fourth embodiments, it is illustrated that a centrifugal multiblade fan is used for the sirocco fans 42a, 43c. Alternatively, the sirocco fans 42a, 43c may be configured as a centrifugal fan having one blade (vane). In the above first to fourth embodiments, it is illustrated that the blowers 42, 43 are configured by use of a sirocco fan and a turbo fan. Alternatively, the blowers 42, 43 may be configured by means of a different type of fan from the sirocco fan and the turbo fan.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle seat air-conditioning device comprising:
a vehicle seat that includes a plurality of regions;
an electric blower that includes:
 a plurality of fans corresponding to the plurality of regions, respectively; and
 one electric motor, wherein the electric blower drives the plurality of fans by the one electric motor to have blowing capacity corresponding to the plurality of regions respectively; and
a plurality of ducts each of which is provided between a corresponding one of the plurality of regions and a corresponding one of the plurality of fans, wherein:
an air flow produced by each of the plurality of fans passes through a corresponding one of the plurality of ducts; and
the air flow passing through each of the plurality of ducts air-conditions or ventilates a corresponding one of the plurality of regions.

2. The vehicle seat air-conditioning device according to claim 1, wherein:
the plurality of regions include a seating surface and a backrest;
the plurality of fans include two fans corresponding to the seating surface and the backrest, respectively; and
the electric blower drives the two fans by the one electric motor.

3. The vehicle seat air-conditioning device according to claim 2, wherein one of the two fans corresponding to the seating surface is configured into such a fan shape as to have higher blowing pressure than the other one of the two fans corresponding to the backrest.

4. The vehicle seat air-conditioning device according to claim 2, wherein one of the two fans corresponding to the backrest is configured into such a fan shape as to have larger blowing air volume than the other one of the two fans corresponding to the seating surface.

5. The vehicle seat air-conditioning device according to claim 2, wherein the one electric motor is disposed on a side of the seating surface of the vehicle seat.

6. The vehicle seat air-conditioning device according to claim 1, wherein the electric blower drives a plurality of types of fans corresponding to the plurality of regions, respectively, by the one electric motor.

7. The vehicle seat air-conditioning device according to claim 1, wherein the electric blower is disposed on one side of the electric motor in an axial direction, and includes a fan that draws in air from the one side in the axial direction and blows the air radially outward by its rotation.

8. The vehicle seat air-conditioning device according to claim 7, wherein the fan is a sirocco fan.

9. The vehicle seat air-conditioning device according to claim 7, wherein the electric blower corresponds to a seating surface.

10. The vehicle seat air-conditioning device according to claim 1, wherein the electric blower is disposed on an other side of the electric motor in an axial direction, and includes a fan that draws in air from the other side in the axial direction and blows the air radially outward by its rotation.

11. The vehicle seat air-conditioning device according to claim 10, wherein the fan is a centrifugal turbo fan.

12. The vehicle seat air-conditioning device according to claim 10, wherein the electric blower corresponds to a backrest portion.

* * * * *